United States Patent
Kurata

(10) Patent No.: US 10,621,509 B2
(45) Date of Patent: Apr. 14, 2020

(54) METHOD, SYSTEM AND COMPUTER PROGRAM PRODUCT FOR LEARNING CLASSIFICATION MODEL

(71) Applicant: INTERNATIONAL BUSINESS MACHINES CORPORATION, Armonk, NY (US)

(72) Inventor: Gakuto Kurata, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 898 days.

(21) Appl. No.: 15/251,008

(22) Filed: Aug. 30, 2016

(65) Prior Publication Data

US 2017/0061330 A1 Mar. 2, 2017

(30) Foreign Application Priority Data

Aug. 31, 2015 (JP) ................................. 2015-170953

(51) Int. Cl.
*G06N 3/08* (2006.01)
*G06N 20/00* (2019.01)
(Continued)

(52) U.S. Cl.
CPC ......... *G06N 20/00* (2019.01); *G06F 16/3344* (2019.01); *G06F 16/355* (2019.01); *G06N 3/084* (2013.01)

(58) Field of Classification Search
CPC ........ G06N 3/0454; G06N 3/084; G06N 3/08; G06N 20/00; G06K 9/6256
See application file for complete search history.

(56) References Cited

U.S. PATENT DOCUMENTS 8,365,019 B2 * 1/2013 Sailer .................. G06F 11/0748
714/25
10,210,860 B1 * 2/2019 Ward ...................... G10L 15/30
(Continued)

FOREIGN PATENT DOCUMENTS

| CN | 101566998 B | 12/2011 |
|---|---|---|
| JP | 03122770 | 5/1991 |
| JP | 06149771 A | 5/1994 |

OTHER PUBLICATIONS

Zhang et al., "Multi-Label Neural Networks with Applications to Functional Genomics and Text Categorization", 2006, IEEE transactions on Knowledge and Data Engineering, pp. 1-14 (Year: 2006).*

(Continued)

*Primary Examiner* — Paulinho E Smith
(74) *Attorney, Agent, or Firm* — Dmitry Paskalov

(57) ABSTRACT

Method, system and computer program product for learning classification model. The present invention provides a computer-implemented method for learning a classification model using one or more training data each having a training input and one or more correct labels assigned to the training input, the classification model having a plurality of hidden units and a plurality of output units is provided. The method includes: obtaining a combination of co-occurring labels expected to be appeared together for an input to the classification model; initializing the classification model with preparing a dedicated unit for the combination from among the plurality of the hidden units so as to activate together related output units connected to the dedicated unit among the plurality of the output units, each related output unit corresponding to each co-occurring label in the combination; and training the classification model using the one or more training data.

20 Claims, 12 Drawing Sheets

(51) Int. Cl.
    *G06F 16/33*     (2019.01)
    *G06F 16/35*     (2019.01)

(56) References Cited

U.S. PATENT DOCUMENTS

| | | | |
|---|---|---|---|
| 2013/0138436 A1 | 5/2013 | Yu et al. | |
| 2016/0379665 A1* | 12/2016 | Kurata | G10L 15/063 704/232 |
| 2017/0061330 A1* | 3/2017 | Kurata | G06F 16/355 |
| 2018/0060730 A1* | 3/2018 | Kurata | G06N 3/084 |
| 2018/0357531 A1* | 12/2018 | Giridhari | G06K 9/6267 |
| 2019/0026646 A1* | 1/2019 | Kurata | G06F 17/2765 |

OTHER PUBLICATIONS

Xu et al., "MultiClass Feature Selection Algorithms Base on R-SVM", 2014, ChineSIP 2014, pp. 525-529 (Year: 2014).*

Min-Ling Zhang et al., Multi-Label Neural Networks with Applications to Functional Genomics and Text Categorization, IEEE Transactions on Knowledge and Data Engineering, Oct. 2006, pp. 1338-1351, vol. 18—Iss. 10, IEEE, Nanjing, China. <http://ieeexplore.ieee.org/document/1683770//>.

Rafal Grodzicki et al., Improved Multilabel Classification with Neural Networks, Parallel Problem Solving from Nature—PPSN X, 2008, pp. 409-416, Series vol. 5199, Springer Berlin Heidelberg, Germany <http://rd.springer.com/chapter/10.1007%2F978-3-540-87700-4_41#page-1/>.

* cited by examiner

METHOD, SYSTEM AND COMPUTER PROGRAM PRODUCT FOR LEARNING CLASSIFICATION MODEL

CROSS-REFERENCE TO RELATED APPLICATIONS

This application claims priority under 35 U.S.C. § 119 from Japanese Patent Application No. 2015-170953 filed Aug. 31, 2015, the entire contents of which are incorporated herein by reference.

TECHNICAL FIELD OF THE INVENTION

The present invention, generally, relates to machine learning, more particularly, to methods, computer systems and computer programs for learning classification models.

BACKGROUND OF THE INVENTION

Neural network based approaches have been widely used for a classification task. A task of retrieving a document that has an answer to a query can be seen as a natural language query (NLQ) classification task. For the NLQ classification task, pairs of a query and a correct document label identifying a document that includes an answer for the query are used for training a classification model. The trained classification model can detect an appropriate document label for a new unseen query by using features of the trained model and the new query.

Some portions of the training queries may have multiple labels for a single instance of the training queries, i.e., label co-occurrence may happen. Thus, the NLQ classification task in nature requires multi-label classification where multiple labels can be assigned to a single instance of training queries and multiple labels can be predicted for a new query. In such multi-label classification, dependency and relationship between the labels need to be taken in consideration. The neural networks can be used for the multi-label classification, also known as a back-propagation multi-label learning (BP-MLL). Recently, replacing BP-MLL's pairwise ranking loss with cross entropy error function has been suggested for efficient text classifications (J. Nam et al., Large-scale Multi-label Text Classification—Revisiting Neural Networks, In Proceedings of the European Conference on Machine Learning and Principles and Practice of Knowledge Discovery in Databases (ECML/PKDD), 437-452, 2014.).

However, there is no known technique that can leverage label co-occurrence information more directly in the learning of the classification models.

[Non-Patent Literature 1] J. Nam et al., Large-scale Multi-label Text Classification—Revisiting Neural Networks, In Proceedings of the European Conference on Machine Learning and Principles and Practice of Knowledge Discovery in Databases (ECML/PKDD), 437-452, 2014.

SUMMARY OF THE INVENTION

According to an embodiment of the present invention, a computer-implemented method for learning a classification model using one or more training data each having a training input and one or more correct labels assigned to the training input, the classification model having a plurality of hidden units and a plurality of output units is provided. The method includes: obtaining a combination of co-occurring labels expected to be appeared together for an input to the classification model; initializing the classification model with preparing a dedicated unit for the combination from among the plurality of the hidden units so as to activate together related output units connected to the dedicated unit among the plurality of the output units, each related output unit corresponding to each co-occurring label in the combination; and training the classification model using the one or more training data.

According to another embodiment of the present invention, a computer-implemented method for learning a classification model using one or more training data each having a training input and one or more correct labels assigned to the training input, the classification model having a plurality of hidden units and a plurality of output units is provided. The method includes: listing a combination of co-occurring labels appeared together in the one or more training data; initializing the classification model with preparing a dedicated unit for the combination, the dedicated unit having connections with related output units each corresponding to each co-occurring label in the combination, each connection being initialized with a value stronger than other connections with remaining output units and between at least part of remaining hidden units among the plurality of the hidden units and the plurality of the output units including the related output units; and training the classification model using the one or more training data.

Furthermore, the present invention also provides a system for learning a classification model using one or more training data each having a training input and one or more correct labels assigned to the training input, the classification model having a plurality of hidden units and a plurality of output units. The system includes: a memory; a processor communicatively coupled to the memory; and a module for learning a classification model configured to carry out the steps of a method including: listing a combination of co-occurring labels expected to be appeared together for an input to the classification model; initializing the classification model with preparing a dedicated unit for the combination from among the plurality of the hidden units so as to activate together related output units connected to the dedicated unit among the plurality of the output units, each related output unit corresponding to each co-occurring label in the combination; and training the classification model using the one or more training data.

In addition, the present invention provides a system for learning a classification model by executing program instructions using one or more training data each having a training input and one or more correct labels assigned to the training input, the classification model having a plurality of hidden units and a plurality of output units. The system includes: a memory; a processor communicatively coupled to the memory; and a module for learning a classification model configured to carry out the steps of a method including: obtaining a combination of co-occurring labels expected to be appeared together for an input to the classification model; initializing the classification model with preparing a dedicated unit for the combination from among the plurality of the hidden units so as to activate together related output units connected to the dedicated unit among the plurality of the output units, each related output unit corresponding to each co-occurring label in the combination; and training the classification model using the one or more training data.

Another embodiment of the present invention provides a non-transitory computer program product for learning a classification model using one or more training data each having a training input and one or more correct labels assigned to the training input, the classification model having a plurality of hidden units and a plurality of output units, including a computer readable storage medium having program instructions embodied therewith, the program instructions executable by a computer to cause the computer to perform the steps of a method. The method includes: obtaining a combination of co-occurring labels expected to be appeared together for an input to the classification model; initializing the classification model with preparing a dedicated unit for the combination from among the plurality of the hidden units so as to activate together related output units connected to the dedicated unit among the plurality of the output units, each related output unit corresponding to each co-occurring label in the combination; and training the classification model using the one or more training data.

DETAILED DESCRIPTION OF THE PREFERRED EMBODIMENTS

Figure 1:
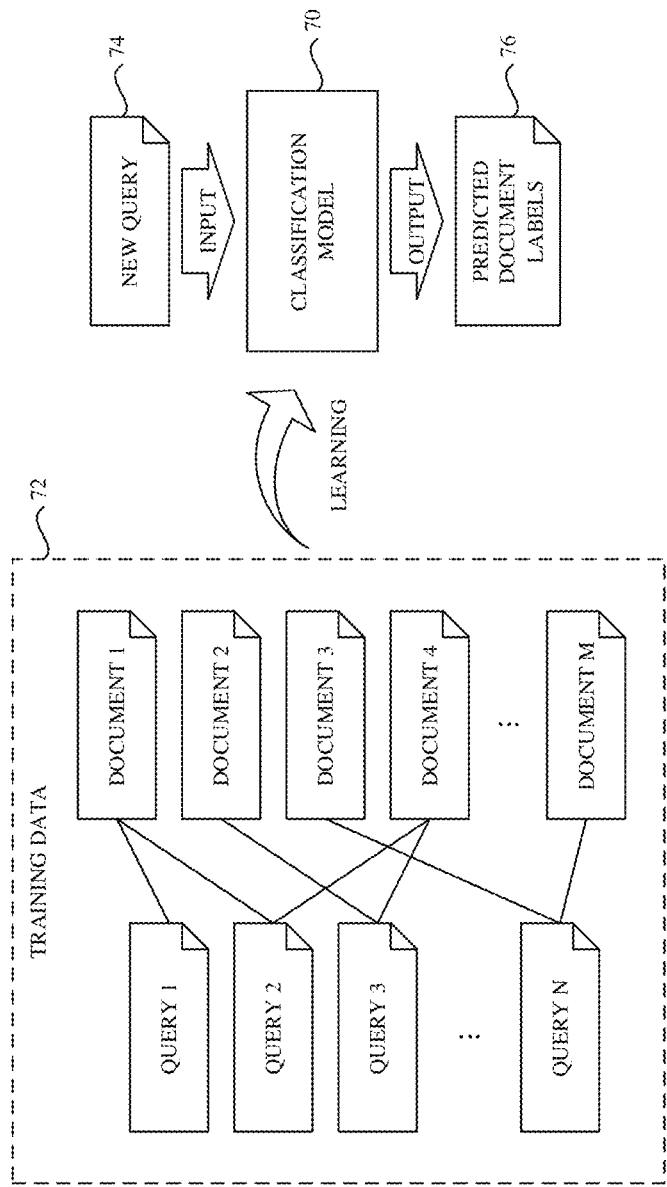
FIG. 1 illustrates a schematic of a classification model for a natural language query based information retrieval system, in which multiple document labels can be assigned to a single instance of training queries.

What is needed are method, associated computer systems and computer programs for learning a classification model, capable of improving accuracy of classification by leveraging label co-occurrence information, without increasing computational overhead for training and classification.

According to an embodiment of the present invention, there is provided a method for learning a classification model using one or more training data. Each training data has a training input and one or more correct labels assigned to the training input. The classification model has a plurality of hidden units and a plurality of output units. The method includes obtaining a combination of co-occurring labels expected to be appeared together for an input to the classification model. The method also includes initializing the classification model with preparing a dedicated unit for the combination from among the plurality of the hidden units so as to activate together related output units connected to the dedicated unit among the plurality of the output units, in which each related output unit corresponds to each co-occurring label in the combination. Also the method includes training the classification model using the one or more training data.

According to the embodiment of the present invention, information of co-occurring multi-labels can be embedded in the classification model without changing complexity of the classification model, thereby improving accuracy of classification without increasing computational overhead for both training and classification.

In a preferred embodiment according to the present invention, the dedicated unit has a connection with each related output unit, in which each connection to each related output unit is initialized with a value stronger than any other connections between the dedicated unit and remaining output units other than the related output units and between at least part of remaining hidden units among the plurality of the hidden units and the plurality of the output units including the related output units. According to the preferred embodiment, information of co-occurring multi-labels can be embedded in initial values of the connections for the dedicated unit without changing topology of the classification model.

In other preferred embodiment according to the present invention, the value varies based on a frequency of the combination appeared in the one or more training data. According to the other preferred embodiment, the frequency of a specific combination appeared in the one or more training data can be taken into account in the initialized connection.

In further other preferred embodiment according to the present invention, the obtaining of the combination of the co-occurring labels includes listing a plurality of combinations of labels co-occurred in the one or more training data; and selecting a subset from among the plurality of the combinations based on a frequency of appearance relevant to each combination in the one or more training data. According to the further other preferred embodiment, relatively popular combinations can be embedded in a preferential manner even if the number of the combinations is increased.

In optional embodiment according to the present invention, the training input is a query in a form of a natural sentence or representation of the natural sentence and each correct label is a document identifier identifying a document having an answer for the query. So, the classification model can perform a natural language query classification task effectively.

In other optional embodiment according to the present invention, the training input is a text in a form of a natural sentence or representation of the natural sentence and each correct label is an attribute assigned for the text. So, the classification model can perform a text classification task effectively.

Computer systems and computer programs relating to one or more aspects of the present invention are also described and claimed herein.

According to other embodiment of the present invention, there is provided a method for learning a classification model using one or more training data. Each training data has a training input and one or more correct labels assigned to the training input. The classification model has a plurality of hidden units and a plurality of output units. The method includes listing a combination of co-occurring labels appeared together in the one or more training data. The method also includes initializing the classification model with preparing a dedicated unit for the combination, in which the dedicated unit has connections with related output units each corresponding to each co-occurring label in the combination and each connection is initialized with a value stronger than other connections with remaining output units and between at least part of remaining hidden units among the plurality of the hidden units and the plurality of the output units including the related output units. Also the method includes training the classification model using the one or more training data.

According to the other embodiment, information of co-occurring multi-labels can be embedded in initial values of the connections for the dedicated unit without changing topology of the classification model, thereby improving accuracy of classification without increasing computational overhead for both training and classification.

Additional features and advantages are realized through the techniques of the present invention. Other embodiments and aspects of the invention are described in detail herein and are considered a part of the claimed invention.

Now, the present invention will be described using particular embodiments, and the embodiments described hereafter are understood to be only referred as examples and are not intended to limit the scope of the present invention. One or more embodiments according to the present invention are directed to methods, computer systems and computer programs for learning a classification model.

A task of retrieving a document that has an answer to a query can be seen as a natural language query (NLQ) classification task. NLQ like "Where should I visit in Japan?" can be differentiated from keyword-based queries like "Japan Sightseeing" used for typical Web search engines. NLQ-based information retrieval system can provide more natural user experiences for end users.

Referring to FIG. 1, there is shown a schematic of a classification model for a NLQ based information retrieval system. For training the classification model 70, pairs of a training query and a correct document label identifying a document that includes an answer for the query are used as training data 72. The classification model 70 is trained by using the training data 72 so as to acquire ability to predict one or more appropriate document labels 76 for a new unseen query 74 by using features of the training and new queries.

As shown in FIG. 1, some portions of the training data 72 may have multiple labels (or co-occurring labels) for a single instance of the training data 72 since plurality of documents that have a similar content can have appropriate answers to a same query. Thus, the NLQ classification task in nature requires multi-label classification.

In the multi-label classification task, dependency and relationship between the co-occurring labels needs to be considered, which are ignored in simple binary relevance approach. Such label co-occurrence can be exploited in the neural network by changing a structure of an output layer, for instance. However, changing the structure of the output layer may increase topological complexity of the neural network, resulting in additional computational overhead during both training and classification.

Therefore, there are needed methods, computer systems and computer programs for learning a classification model, capable of improving accuracy of classification by leveraging label co-occurrence information, without increasing computational overhead for training and classification.

In one or more embodiments according to the present invention, a novel learning process is performed by a computer system using one or more training data, in which the classification model is initialized by preparing a hidden unit dedicated for each combination of the co-occurring labels in the classification model. Each training data may have a training input and one or more correct labels assigned to the training input. The classification model may have an input layer including a plurality of input units; one or more hidden layers including a plurality of hidden units; and an output layer including a plurality of output units.

During the novel learning process, the computer system lists combination of labels appeared together in the one or more training data to obtain a combination of co-occurring labels expected to be appeared together for an input. Then, the computer system initializes the classification model with preparing a dedicated unit for each combination in the hidden layer below the output layer so as to activate together related output units corresponding to each co-occurring label in the combination among all output units in the output layer. In other aspect, each connection between the dedicated unit and the related output unit is initialized with a value stronger than any other connections between the dedicated unit and remaining output units in the output layer and between remaining hidden units in the output layer and the plurality of the output units including the related output units. Then, the computer system trains the classification model using the one or more training data based on standard learning algorithms such as backpropagation algorithms for the neural network.

Now, referring to the series of FIGS. 2-8, there are shown computer systems and methods for learning classification models according to one or more embodiments of the present invention. The novel learning technique is not specific to the NLQ classification model and the novel learning technique can be generic and applicable to any classification models. The data treated by the classification models may not be limited to queries and texts, and can be expanded to any data such as image data, acoustic speech data, video data, etc.

Hereinafter, referring to the series of FIGS. 2-5, it will be described a computer system and method for learning a natural language query (NLQ) classification model according to a first embodiment of the present invention. Then, referring to the series of FIGS. 6-7, it will be described a computer system and method for learning a topic categorization (or text classification) model according to a second embodiment of the present invention. Additionally, referring to FIG. 8, it will be described a computer system and method for learning generalized neural network based classification model according to an alternative embodiments of the present invention, in which two step learning process including an unsupervised pre-training and a supervised fine-tuning is performed in deep learning architectures.

First Embodiment

Figure 2:
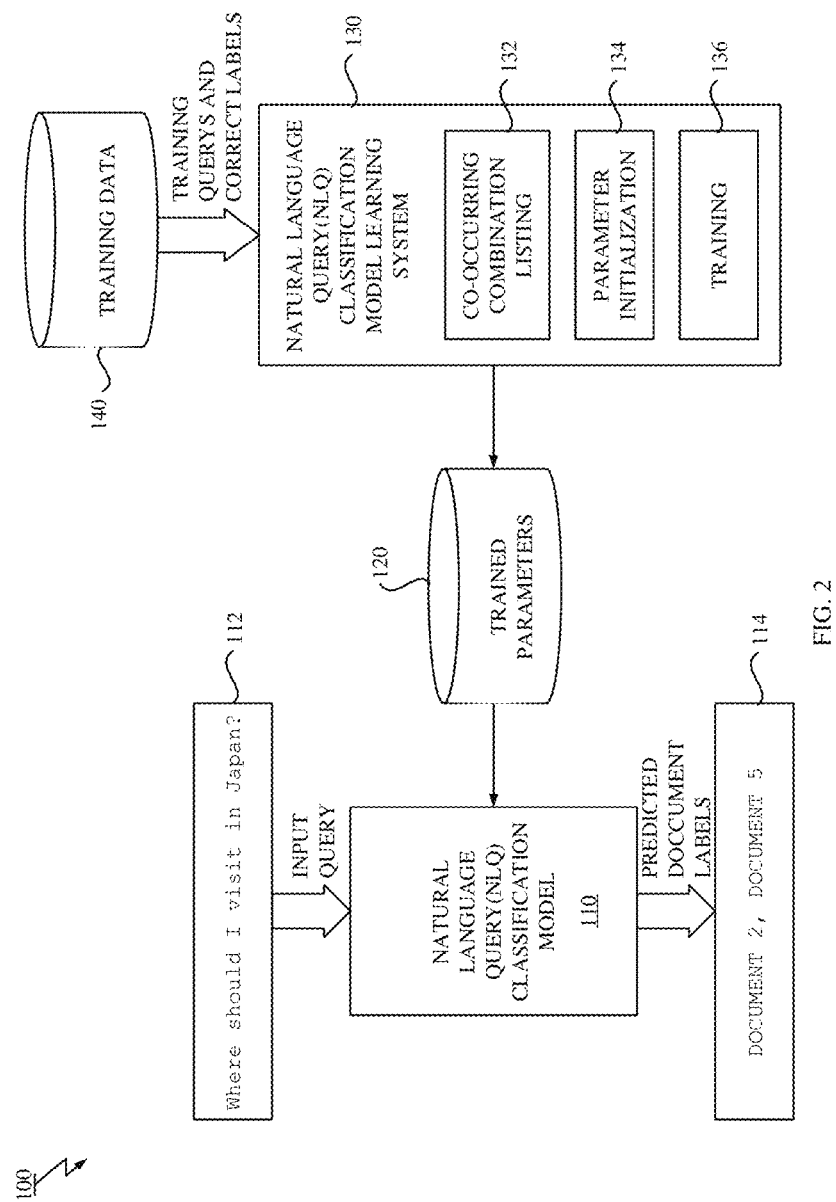
FIG. 2 illustrates a block diagram of a computer system incorporating a natural language query classification model and a learning system for the natural language query classification model according to a first embodiment of the present invention.

FIG. 2 illustrates a block diagram of a computer system incorporating a NLQ classification model and a learning system for the NLQ classification model according to the first embodiment of the present invention.

As shown in FIG. 2, the computer system 100 includes the NLQ classification model 110 that receives an input query 112 and outputs one or more predicted document labels 114 based on trained parameters 120; and the NLQ classification model learning system 130 that performs machine learning of the NLQ classification model 110 based on training data 140 to obtain the trained parameters 120.

Figure 3:
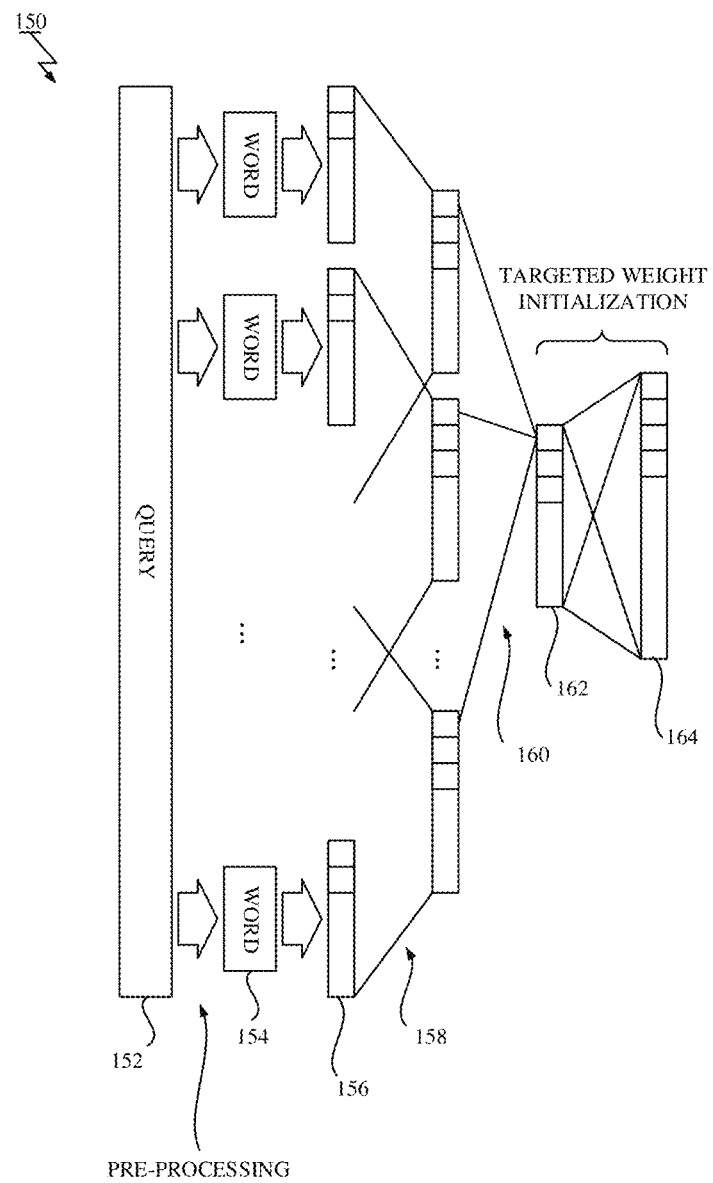
FIG. 3 depicts architecture of the natural language query classification model according to the first embodiment of the present invention.

Referring to FIG. 3, architecture 150 of the NLQ classification model 110 is depicted. In the describing embodiment, the NLQ classification model 110 is a neural network based classification model. The architecture 150 of the NLQ classification model 110 may include a query input layer 152, a word layer 154, a distributed representation layer 156, a top hidden layer 162 and a label prediction layer 164.

Between the distributed representation layer 156 and the top hidden layer 162, that is a hidden layer just below the label prediction layer 164, there is at least one convolutional layer 158 with a sub-sampling layer 160 to form a convolutional neural network (CNN). The NLQ classification model 110 may have repeated sets of the convolutional layer 158 and the subsampling layer 160, optionally followed by further one or more fully connected layers below the top hidden layer 162.

The NLQ classification model 110 may need to accept queries with variable length. The NLQ classification model 110 receives an input query in a form of natural sentence like "Where should I visit in Japan?" by the query input layer 152. Words in the input query are first subjected to appropriate pre-processing such as stop word removal, and then the processed words 154 are converted into distributed representation in the distributed representation layer 156. The convolutional layer 158 may have k kernels to produce k feature maps. Each feature map is then subsampled typically mean or max pooling. By applying convolution 158 and sub-sampling 160 over time, a fixed-length feature vectors are extracted from the distributed representation layer 156 into the top hidden layer 162. Then, the fixed-length feature vectors are then fed into the label prediction layer 164 to predict the one or more document labels 114 for the input query 112.

The label prediction layer 164 has a plurality of units each corresponding to each predefined document label that is a document identifier identifying a document having an answer for the query. The document labels can be defined as labels appeared in the training data 140. The number of the units in the label prediction layer 164 may be same as the number of the document labels appeared in the training data 140. Additional units for combinations of the label co-occurrence are not required in the describing embodiment.

Loss function used in the label prediction layer 164 can be any one of known loss functions that can or can not take care of multi-label, and such loss function preferably includes, but not limited to, negative log probability, cross entropy, and binary cross entropy.

Let x denote the feature vector of an input query, y be the vector representation of the label, o be the output value of the neural network, and P be the parameters of the neural network. Note that the representation of y is different depending on the loss functions. For simplicity in the following description, let assume that a finite set of labels L={$L_1$, $L_2$, $L_3$} and a input query x has multiple labels {$L_1$, $L_3$}.

Negative Log Probability:

Minimization of negative log probability assumes a single label. To take care of multi-label, copy transformation can be used to obtain two training data ((x, $y^{(1)}$), (x, $y^{(2)}$)), where $y^{(1)}$=(1, 0, 0) and $y^{(2)}$=(0, 0, 1). The loss for each training data becomes I (P, (x, $y^{(1)}$))=−log ($o_1$) and I (P, (x, $y^{(2)}$))=−log ($o_3$), where softmax activation is used to calculate o in the label prediction layer 164.

Cross Entropy:

To take care of multi-labels, let us assume multi-labels as probabilistic distribution y=(0.5, 0, 0.5). The cross entropy loss for the training data (x, y) becomes I (P, (x, y))=−y log (o), where softmax activation is used in the label prediction layer 164.

Binary Cross Entropy:

To handle multi-labels, let us assumed the labels as y=(1, 0, 1). The binary cross entropy loss for the training example (x, y) becomes as follows:

$$I(P,(x,y)) = -\Sigma_{i=1}^{3}(y_i \log(o_i) + (1-y_i)\log(1-o_i))$$ [Formula 1]

where sigmoid activation is used in the label prediction layer 164.

Typically, a structure from the distributed representation layer 156 to the label prediction layer 164 can be trained as a neural network. So, in describing embodiment, an input layer of the neural network is the distributed representation layer 156 and an output layer of the neural network is the label prediction layer 164. However, this is an example of possible designs for one or more embodiments of the present invention, whole structure from the query input layer 152 to the label prediction layer 164 can be trained as a neural network in a particular other embodiment.

Referring back to FIG. 2, the NLQ classification model learning system 130 performs the process for learning the NLQ classification model 110 according to the first embodiment of the present invention. The NLQ classification model learning system 130 performs the learning process using the given training data 140 to optimize parameters of the NLQ classification model 110.

In the describing embodiment, the training data 140 includes one or more instances of the training data, each of which has a training input query and one or more correct document labels assigned to the training input query. Some portions of the training data 140 may have multiple correct labels for a single instance of the input queries. The document labels may be assigned by typically human experts. The training input query may be prepared in a form of a natural sentence or representation of the natural sentence depending on the architecture of the neural network based NLQ classification model. In a particular embodiment where the structure from the distributed representation layer 156 to the label prediction layer 164 is trained as the neural network, the training input query in a form of a natural sentence may be converted into a representation in the distributed representation layer 156 to prepare the training input for the neural network.

In the describing embodiment, the learning system 130 includes a co-occurring combination listing module 132, a parameter initialization module 134 and a training module 136.

The co-occurring combination listing module 132 is configured to list the labels co-occurred in the training data 140 so as to obtain combinations of co-occurring labels expected to be appeared together for an input query. In a preferable embodiment, the co-occurring combination listing module 132 is further configured to select a subset from among the listed combinations. The selection of the subset may be performed based on a frequency of appearance relevant to each combination in the given training data 140. The frequency may include a frequency of each combination appeared in the training data 140, Freq(L1,L2), frequencies of co-occurring labels appeared in the training data 140, Freq(L1), Freq(L2), and combination of these frequencies such as Freq(L1,L2)$^2$/(Freq(L1)*Freq(L2)). By selecting the subset, relatively popular co-occurring combinations can be treated in a preferential manner even if the number of the combination exceeds capacity of the novel learning technique owing to the topology of the neural network.

The parameter initialization module 134 initializes all parameters of the NLQ classification model 110 that should be trained. In the describing embodiment, the parameter initialization module 134 is configured to initialize the NLQ classification model 110 with preparing each dedicated unit for each listed or selected combination from among hidden units in the top hidden layer 162. Each dedicated unit is initialized so as to activate together related output units corresponding to co-occurring labels in the combination among all output units in the label prediction layer 164.

In other aspect, the parameter initialization module 134 is configured to initialize each connection between the dedicated unit and each related output unit with a value stronger than other connections between the dedicated unit and remaining output units and between remaining hidden units in the top hidden layer 162 and the output units including the related output units. The novel initialization embeds co-occurrence label information in a weight matrix between the top hidden layer 162 and the label prediction layer 164 shown in FIG. 3.

The weight value can be a constant value or varied based on a frequency of the combination appeared in the one or more training data 140. The constant value may be an upper limit value for the weights or an upper bound for normalized initialization to other weights. Assigning dedicated units and initializing their weight matrix will be described more detail later.

The training module 136 is configured to train the NLQ classification model 110 using the training data 140 based on the parameters initialized by the parameter initialization module 134. Any known training algorithm including back-propagation algorithms and their variants can be used for training the NLQ classification model 110 after the parameter initialization. The training module 136 may conduct the back-propagation using the loss function. Note that the weights between the dedicated units and all output units corresponding to all document labels are updated through the backpropagation.

In a particular embodiment, each of modules described in FIG. 2 may be implemented on a computer, where program codes according to the embodiment of the present invention are loaded on a memory and executed by a processor.

As shown in FIG. 2, the computer system 100 includes one or more modules to provide various features and functions. These modules may be implemented in hardware, software or firmware executable on hardware, or a combination thereof. Also, these modules are presented only by way of example and are not intended to suggest any limitation. Alternative embodiments may include additional or fewer modules than those illustrated in FIG. 2, or the modules may be organized differently. Furthermore, it should be recognized that, in some embodiments, the functionality of some modules may be broken into multiple modules or, conversely, the functionality of several modules may be combined into a single or fewer modules.

Figure 4:
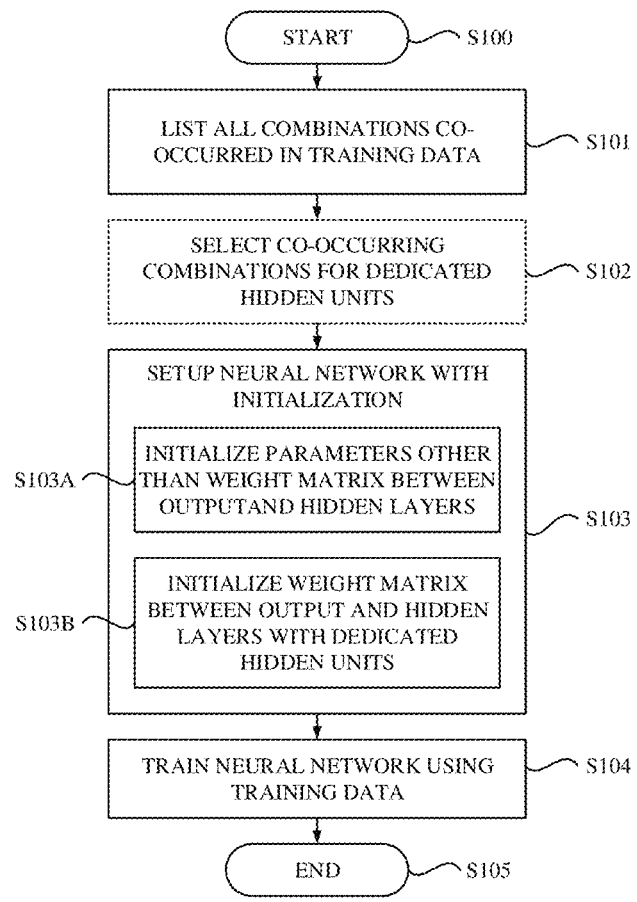
FIG. 4 is a flowchart depicting a process for learning the natural language query classification model according to the first embodiment of the present invention.

FIG. 4 shows a flowchart depicting the process for learning the NLQ classification model according to the first embodiment of the present invention. As shown in FIG. 4, the process begins at step S100. Note that the process shown in FIG. 4 is performed by the learning system 130 depicted in FIG. 2 for the given training data 140.

At step S101, the learning system 130 reads the training data 140 and analyzed to list a plurality of co-occurring combinations found in the given training data 140. At step S102, the learning system 130 may select a subset for dedicated hidden units from among the found co-occurring combinations.

The processing at step S102 may be performed optionally. If the number of the co-occurring combinations is sufficiently smaller than the number of units in the top hidden layer 162, all found combinations may be used for dedicated hidden units. If the number of the co-occurring combinations is approximately equal to or larger than the number of units in the top hidden layer 162, the learning system 130 can select a subset from among the co-occurring combinations found at step S101 based on a frequency of appearance relevant to each combination in the given training data 140. According to the selection, relatively popular co-occurring combinations can be embedded into the neural network in a preferential manner even if the number of the combinations exceeds the number of the hidden units in the top hidden layer 162.

At step S103, the learning system 130 setups the neural network of the NLQ classification model 110 with parameter initialization. The parameters that should be trained may include weight matrixes associated with the connections between layers and bias vectors associated with the layers.

Especially, at step S103A, the learning system 130 initializes the parameters other than the targeted weight matrix between the top hidden layer 162 and the label prediction layer 164. At step S103B, the learning system 130 initializes the targeted weight matrix between the top hidden layer 162 and the label prediction layer 164.

Figure 5:
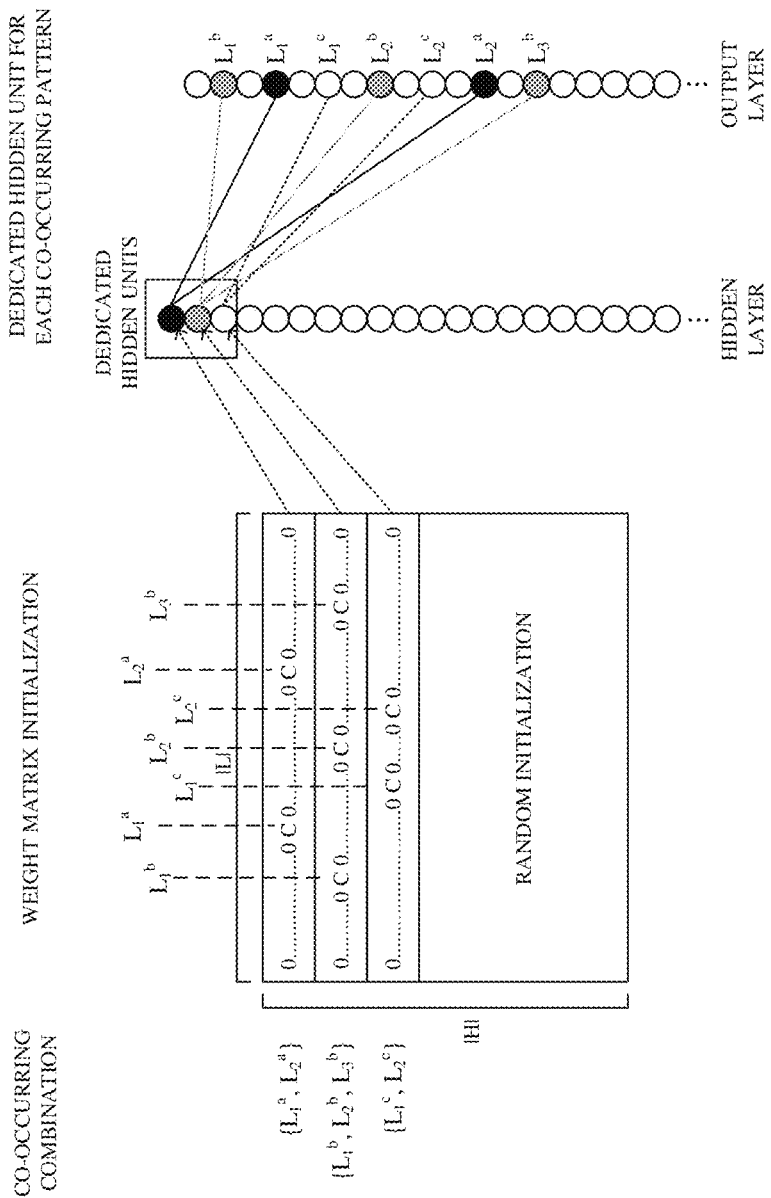
FIG. 5 depicts overview of a weight initialization for connections between a top hidden layer and an output layer according to the first embodiment of the present invention.

FIG. 5 depicts overview of a weight initialization for connections between the top hidden layer 162 and the label prediction layer 164. In FIG. 5, three combinations of co-occurring labels that includes $\{L_1^a, L_2^a\}$, $\{L_1^b, L_2^b, L_3^b\}$ and $\{L_1^c, L_2^c\}$ are listed illustratively for dedicated unit. The weight matrix has matrix rows corresponding to the hidden units, |H|, and columns corresponding to the document labels, |L|. As shown in left side of FIG. 5, for each combination of co-occurring labels, a matrix row is initialized so that each column corresponding to each co-occurring label is prepared to have a certain weight C and other remaining columns are prepared to have a weight equal to zero. The matrix row corresponding to each combination of the co-occurring labels is referred as a dedicated row.

Note that the remaining rows that are not associated with the combinations of co-occurring labels may be initialized by any known methods. In describing embodiment, the remaining rows are prepared with random initialization.

This weight initialization is equivalent to prepare each hidden unit dedicated for each combination of the co-occurring labels in the top hidden layer 162, where the dedicated units have connections to the related output units corresponding co-occurring labels with weight C and to others with zero, as shown in right side of FIG. 5. The columns corresponded to the co-occurring labels are initialized with the C stronger than the remaining columns. These dedicated neurons can simultaneously activate the related output units corresponding to the co-occurring labels in the combination in preferential manner. Note that the term "simultaneously" is defined as two or more output units being activated together for a single instance of inputs and is not intended to add a temporal restriction.

Note that preparing the dedicated hidden units does not require any additional output and hidden units in the architecture of the neural network, the topologies between the neural networks with and without the dedicated hidden units can be identical and merely initialized weights for certain hidden unit that is prepared as the dedicated units can be different.

In particular embodiment, the value C of the weight may be an upper limit value for the connection, e.g. 1.0 within the range −1~1. In a preferable embodiment, the value C of the weight may be an upper bound (UB) for normalized initialization for the remaining rows, which is determined by the number of units in the top hidden layer 162 and the label prediction layer 164. In further other preferable embodiments, the value C of weight may vary based on a frequency of the combination appeared in the training data 140. The frequency of a specific combination appeared in the training data 140 can be taken into account in the initialized connection. The background idea is that specific combinations of co-occurring labels that appear frequently (i.e., the number of the queries with specific combination of labels is large) are more important than less frequent combinations. Assuming that a specific combination of label co-occurrence appears in the training data f times, in particular embodiments, f×UB and $f^{1/2}$×UB can be used for examples.

Referring back to FIG. 4, at step S104, the learning system 130 trains the neural network of the NLQ classification model 110 based on the backpropagation algorithm by using the given training data 140. Note that the weights between the dedicated units and all output units corresponding to all document labels are updated through the training at step S104. Then, the process ends at step S105.

The obtained parameters of the NLQ classification model 110 may be stored as the trained parameters 120 in an appropriate storage system. The classification model 110 based on the trained parameters 120 can predict appropriate one or more document labels for a new input query. So, the trained NLQ classification model can perform a natural language query classification task effectively.

The dedicated units after the training can still simultaneously activate the related output units corresponding to the co-occurring labels even though the initialized weights of the dedicated units are updated through the training by the training module 136.

According to the novel learning process shown in FIG. 4, co-occurrence multi-labels information can be embedded in the classification model without changing complexity of the classification model. The trained classification model 110 can predict appropriate one or more document labels for a new input query efficiently even if plurality of appropriate documents that have an answer for same query exist.

Since computation of the novel weight initialization is negligible and computation of the backpropagation and the architecture of the neural network do not change between with and without the novel weight initialization. Thus, accuracy of the NLQ classification can be improved without increasing computational overhead for both training and classification.

Also according to the novel learning process shown in FIG. 4, the value can vary based on a frequency of the combination appeared in the training data 140. Thus, the frequency of a specific combination appeared in the training data 140 can be taken into account in the initialized connection.

Also according to the novel learning process shown in FIG. 4 where processing at step S102 is performed, relatively popular co-occurring combinations can be embedded in a preferential manner even if the number of the combinations is increased.

Second Embodiment

Now referring to the series of FIGS. 6-7, it will be described a computer system and method for learning a classification model according to the second embodiment of the present invention.

Figure 6:
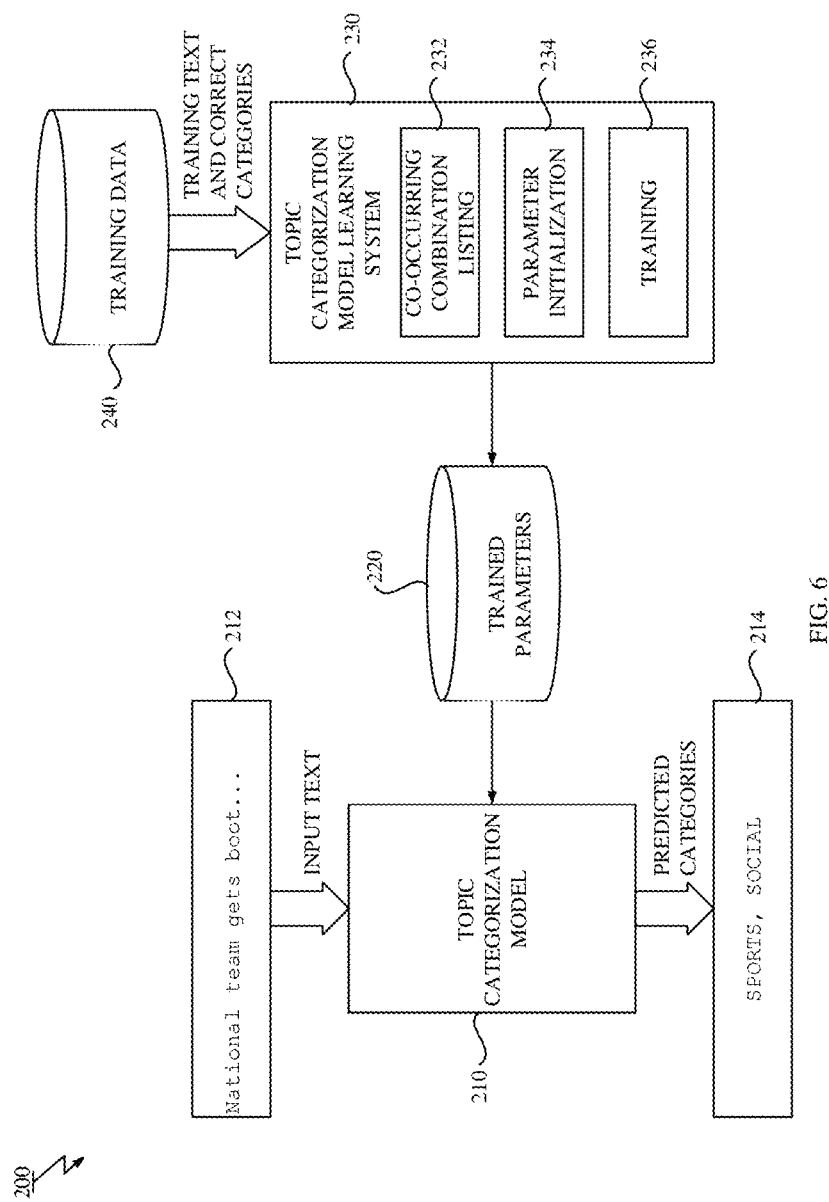
FIG. 6 illustrates a block diagram of a computer system incorporating a topic categorization model and a learning system for the topic categorization model according to a second embodiment of the present invention.

FIG. 6 illustrates a block diagram of a computer system incorporating a topic categorization model and a learning system for the topic categorization model according to the second embodiment of the present invention.

As shown in FIG. 6, the computer system 200 includes the topic categorization model 210 that receives an input text 212 and outputs one or more topic category labels 214 based on trained parameters 220; and the topic categorization model learning system 230 that performs machine learning of the topic categorization model 210 based on training data 240 to obtain the trained parameters 220.

Figure 7:
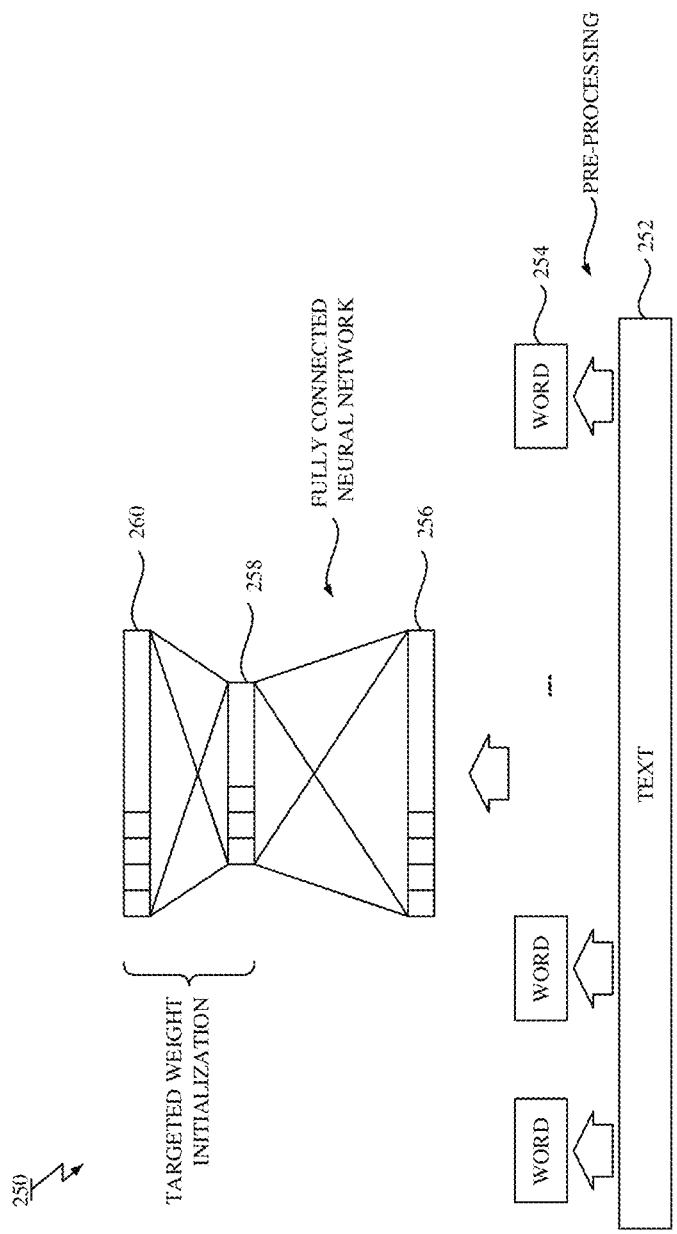
FIG. 7 depicts architecture of a neural network based topic categorization model according to the second embodiment of the present invention.

Referring to FIG. 7, architecture 250 of the topic categorization model 210 is depicted. In the describing embodiment, the topic categorization model 210 is a neural network based classification model. The architecture 250 of the topic categorization model 210 includes a text input layer 252, a word layer 254, a BOW (bag-of-words) feature layer 256, a top hidden layer 258 and a label prediction layer 260.

The topic categorization model 210 also may be required to accept texts with variable length. The topic categorization model 210 receives an input text in a form of natural sentence by the text input layer 252. Words in the input text are first subjected to appropriate pre-processing such as stop word removal, and then the processed words 254 are converted into simplified representation in the BOW feature layer 256. In the BOW, grammar and word order may be disregarded.

The structure from the BOW feature layer 256 to the label prediction layer 260 constitutes a feed forward neural network with an input layer that accepts BOW feature, one or more hidden layers, and an output layer that outputs category predictions.

The label prediction layer 260 has a plurality of units each corresponding to each predefined topic category label, such as "sports", "social", "international", etc. The topic category labels can be defined manually by human experts. The number of the units in the label prediction layer 260 may be same as the number of the predefined categories. Additional units for combinations of label co-occurrence are not required in the describing embodiment. Loss function used in the label prediction layer 260 may be any loss function that can take care of multi-label, and such loss function preferably includes, but not limited to, negative log probability, cross entropy, and binary cross entropy.

Typically, a structure from the BOW feature layer 256 to the label prediction layer 260 can be trained as a neural network. So, in describing embodiment, an input layer of the neural network is the BOW feature layer 256 and an output layer of the neural network is the label prediction layer 260. However, this is an example of possible designs for one or more embodiments of the present invention, whole structure from the text input layer 252 to the label prediction layer 260 can be trained as a neural network in particular other embodiment.

Referring back to FIG. 6, the topic categorization model learning system 230 performs the process for learning the topic categorization model 210 according to the second embodiment of the present invention that is similar to the process for learning the NLQ classification model shown in FIG. 4. The topic categorization model learning system 230 performs the learning process using the given training data 240 to optimize parameters of the topic categorization model 210.

In the describing embodiment, the training data 240 includes one or more instances of the training data, each of which has training input text such as news articles and one or more correct topic category labels assigned to the training input text. Some portions of the training data 240 may have multiple labels for a single instance of the input texts. The training input text may be prepared in a form of a natural sentence or representation of the natural sentence depending on the architecture of the neural network based classification model.

In the describing embodiment, the learning system 230 includes a co-occurring combination listing module 232, a parameter initialization module 234 and a training module 236, each of which are configured as similar to corresponding module in the first embodiment shown in FIG. 2.

Especially, the parameter initialization module 234 is configured to initialize the topic categorization model 210 with preparing each dedicated unit for each listed or selected combination in the top hidden layer 262. Each dedicated unit is initialized so as to activate simultaneously related output units corresponding to co-occurring labels in the combination among the label prediction layer 260 as described with FIG. 5. In other aspect, the parameter initialization module 234 is configured to initialize each connection between the dedicated unit and each related output unit with a value stronger than other connections between the dedicated unit and remaining output units.

The trained topic categorization model 210 can predict appropriate one or more topic category labels for a new input text. So, the trained topic categorization model 210 can perform a natural language text categorization task effectively without increasing computational overhead during training and classification.

Alternative Embodiment

As described above, the novel learning technique according to one or more embodiments of the present invention is not specific to the NLQ classification task and the topic categorization task; the technique can be generic and applicable to any classification task.

Hereinafter, referring to the FIG. 8 there is shown a computer system and method for learning classification model according to an alternative embodiment of the present invention, in which the classification models is constructed in deep learning architectures.

In the deep learning architecture, a multilayered deep neural network (DNN) has one or more hidden layers with a plurality of hidden units between input and output layers. FIG. 8 shows a DNN based classification model 300 that performs a classification task.

To train the DNN, typically, a two-steps learning process that includes an unsupervised pre-training and a supervised fine-tuning may be performed. Such two-steps learning process can be used for classification models for acoustic speech recognitions and image recognitions. The pre-training finds representation that well captures characteristics of the input and stacks layers with initializing parameters. Activation in the hidden layer can be seen as a better representation that expresses input. The fine-tuning process discriminatively updates the parameters of the DNN based on the representations estimated by the pre-training process. Of course this is an example of possible learning process for the DNN, in other embodiment, the pre-training may be omitted.

Figure 8:
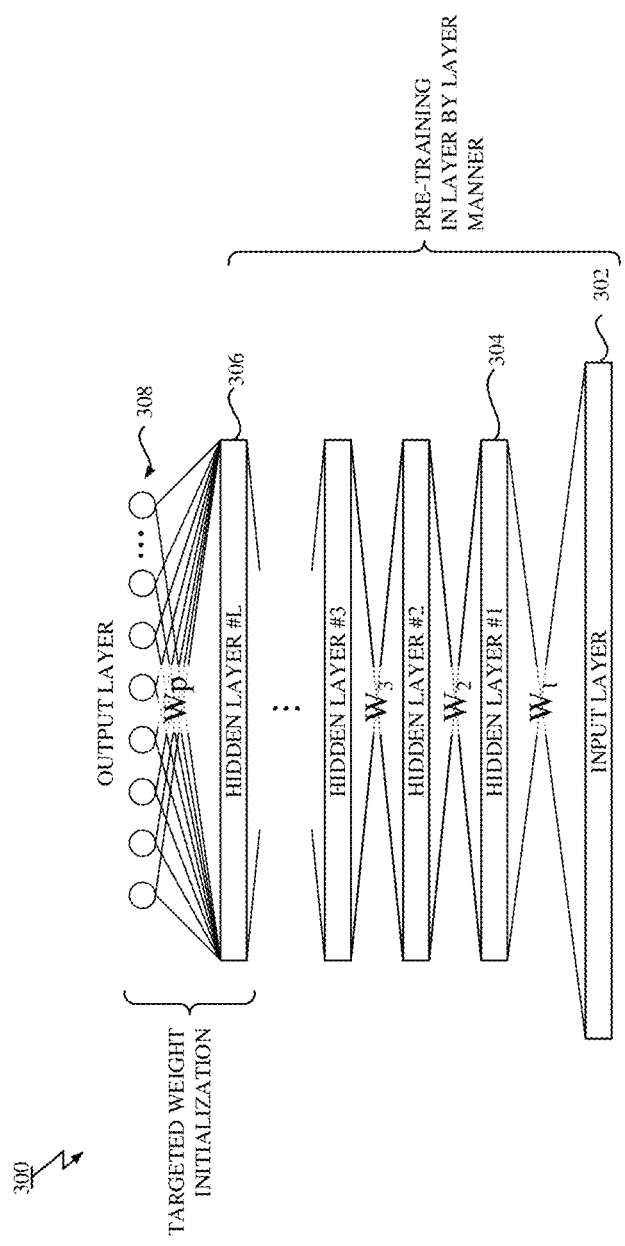
FIG. 8 depicts other targeted architecture of a neural network based classification model according to alternative embodiment of the present invention.

Referring to FIG. 8, the DNN based classification model 300 includes one or more hidden layers 304-306 between an input layer 302 and an output layer 308. The DNN based classification model 300 receives an input signal, perform a classification task to output predicted labels based on the trained parameters.

During the pre-training process, the parameters of the DNN based classification model 300 are initialized in a layer by layer manner if necessary. After initializing parameters for all layers, the DNN based classification model 300 is constructed by stacking the output layer 308 on the top hidden layer 306 and by adding a weight matrix for connections between units of the top hidden layer 306 and units of the output layer 308. The novel weight initialization technique can be applied to the DNN based classification model 300 so as to prepare the weight matrix between the top hidden layer 306 and the output layer 308.

After all parameter initialization are completed, the whole DNN including the parameters initialized by the novel weight initialization are discriminatively trained by updating the parameters using backpropagation algorithm during the supervised fine-tuning process.

In one or more embodiments according to the present invention, the weight matrix between the top hidden layer 306 and the output layer 308 of the DNN based classification model 300 can be initialized by using the novel weight initialization as described in FIG. 5. Thus, the computer system and method for learning the deep neural network based classification model may include the novel learning process shown in FIG. 4 to initialize the weight matrix between top hidden layer 306 and output layer 308 before the fine-tuning process and to train the DNN based classification model 300 during the fine-tuning process. The trained DNN based classification model 300 can predict appropriate one or more labels for a new input signal. So, the trained DNN based classification model 300 can perform a classification task effectively without increasing computational overhead during training and classification.

Even though the parameters are finely tuned after initializing the parameters in the deep learning architectures, resulted performance of the DNN based classification model 300 can be affected on how the parameters are initialized closely to the good solution. Accordingly, it can be expected that the performance of the DNN based classification model 300 can be improved by the novel learning process.

Experimental Studies for Real-World Data

A program implementing the process shown in FIG. 4 according to the first embodiment was coded and executed for QA (question and answer) data in English in the insurance domain. Queries are inputted in natural language and the classification model returns the documents that contain answers for the query. 3,133 and 394 queries were included in the training data and the evaluation data, respectively. 1,695 and 158 co-occurring labels were found in the training data and the evaluation data, respectively. The number of the unique document labels assigned to the training data was 526.

The neural network with the architecture shown in FIG. 3 was employed. The dimension of the distributed representation layer 156 was 100. The number of kernels for CNN, k, was set to be 1,000, which means 1,000 units exist in the top hidden layer 162. The number of output units in the label prediction layer 164 was set to be 526. This configuration was used in common in all examples and comparative examples for the real-world data. The neural network was randomly initialized in accordance with the normalized initialization, AdaGrad was used to control the learning rate and the number of training epochs was fixed to 1,000 for all examples and comparative examples unless otherwise noted.

By the processing at step S101 shown in FIG. 4, 1,695 queries in the training data were found to have co-occurring multiple labels and 252 combinations of co-occurring labels were found. By the processing at step S103B shown in FIG. 4, a weight matrix of 1000×526 between the top hidden layer 162 and the label prediction layer 164 were initialized with preparing 252 dedicated hidden units for the examples and without preparing any dedicated hidden units for the comparative examples.

Three evaluation metrics including "1-best accuracy", "Recall@5", and "Full accuracy" were used for evaluation. The "1-best accuracy" judges whether the 1-best result is included in the correct labels or not. The "Recall@5" judges whether the 5-best results includes at least one of the correct labels or not. Assuming that j labels are assigned to the query, the "Full accuracy" investigates the j-best results and judges whether the j-best results match the correct labels or not. If a query has three labels, the system needs to return 3-best results that contain the three correct labels of the query to obtain 100% full accuracy.

For the examples 1-3 and the comparative examples 1-3, three different loss functions including negative log likelihood (example 1, comparative example1), cross entropy (example 2, comparative example 2) and binary cross entropy (example 3, comparative example 3) were used. As for the examples 1-3, the value C for the novel learning process was set to be the upper bound of randomization for other rows.

The evaluated results of the examples 1-3 and the comparative examples 1-3 are summarized as follow:

TABLE 1

| | ACCURACY | | |
|---|---|---|---|
| EXAMPLE | 1-BEST ACCURACY [%] | RECALL@5 [%] | FULL ACCURACY [%] |
| Comparative Example 1 (Negative Log Likelihood) | 49.75 | 69.80 | 47.03 |
| Example 1 (Negative Log Likelihood) | 51.27 | 71.07 | 48.65 |
| Comparative Example 2 (Cross Entropy) | 50.51 | 71.32 | 46.96 |
| Example 2 (Cross Entropy) | 52.54 | 72.08 | 48.71 |
| Comparative Example 3 (Binary Cross Entropy) | 49.75 | 70.81 | 48.09 |
| Example 3 (Binary Cross Entropy) | 50.51 | 71.32 | 48.34 |

Table 1 shows the experimental results using three different loss functions. By comparing the accuracy between the examples 1-3 and the comparative examples 1-3, improvement for all loss functions with every evaluation metric were obtained by the novel learning process. Among the examples 1-3, the example 2 (with cross entropy loss function) was shown to be best in all three metrics, where 1-best accuracy improvement from 50.51% to 52.54% was statistically significant ($p<0.05$).

The analysis on whether the dedicated units for combinations still simultaneously activate the corresponding labels in the trained neural network for the examples 1-3 are summarized as follow:

TABLE 2

| EXAMPLES | NUMBER OF SURVIVED DEDICATED UNITS | WEIGHTS-DEDICATED [MEANS/VARIANCE] | FULL ACCURACY WEIGHT-ALL [MEANS/VARIANCE] |
|---|---|---|---|
| Example 1 (Negative Log Likelihood) | 194/252 | 0.251/0.004 | −0.024/0.023 |
| Example 2 (Cross Entropy) | 197/252 | 0.267/0.005 | −0.017/0.021 |
| Example 3 (Binary Cross Entropy) | 168/252 | 0.279/0.015 | −0.007/0.011 |

Table 2 shows the analysis on the neural networks trained. In the column of the number of the survived unit, the number of the dedicated units that were initialized for the combination of k-label and still had the k largest weights to the corresponding k labels after back-propagation is presented. It was demonstrated that large portions of the dedicated units "survived" after backpropagation in all examples 1-3.

In the columns of weights, the mean of the connection weights between the dedicated units and the corresponding co-occurring labels, and the mean of all connections in the weight matrix are presented. The trained weights for the connections between the dedicated units and the corresponding co-occurring outputs (Weights-Dedicated) were much stronger than the average weights (Weights-All). It was shown that the novel initialization yields the dedicated units that activate simultaneously the co-occurring labels even after backpropagation.

The value C for the novel learning process was set to be the upper bound in the examples 1-3, different initialization values including C=1.0 (example 4), C=f×UB (example 5), C=$f^{1/2}$×UB (example 6) where f is the frequency of the set of the multiple labels in the training data, were employed. The loss function for all examples 4-6 was the cross entropy loss.

The evaluated results of the examples 2, 4-6 and the comparative example 2 with the cross entropy function are summarized as follow:

TABLE 3

| | ACCURACY | |
|---|---|---|
| EXAMPLE | 1-BEST ACCURACY [%] | FULL ACCURACY [%] |
| Comparative Example 2 | 50.51 | 46.96 |
| Example 2 (UB) | 52.54 | 48.71 |
| Example 4 (Upper Limit = 1.0) | 51.52 | 49.16 |
| Example 5 (fx UB) | 51.52 | 48.39 |
| Example 6 ($f^{1/2}$ × UB) | 53.55 | 50.04 |

The results in Table 3 show that using $f^{1/2}$×UB yielded further improvement in both 1-best accuracy and full accuracy. It was shown that setting C according to the square root of the frequency of the set of multiple labels in the training data can further improve the accuracy.

The real-world classification task usually suffers from limited data size. Here, the training data size was decreased from the original 3,133 (example 2 and comparative example 2) to 1,000 (example 7 and comparative example 4) and 2,000 (example 8 and comparative example 5). Cross entropy loss function was used for examples 7-8 and comparative examples 4-5. When training with the 1K and 2K training data, subset of combinations of co-occurring label were extracted from these two sets individually.

The evaluated results of the examples 2, 7-8 and the comparative example 2, 4-5 with the cross entropy function are summarized as follow:

TABLE 4

| EXAMPLES/ | 1-BEST ACCURACY [%] | | |
|---|---|---|---|
| DATA SIZE | 1K | 2K | 3K |
| Compamtive Examples | 40.36 (comparative 4) | 47.46 (comparative 5) | 50.51 (comparative 2) |
| Examples | 42.13 (example 7) | 48.22 (example 8) | 52.54 (example 2) |

The results in Table 4 indicate that the novel learning method consistently improved the 1-best accuracy even if training data was further limited.

Figure 9:
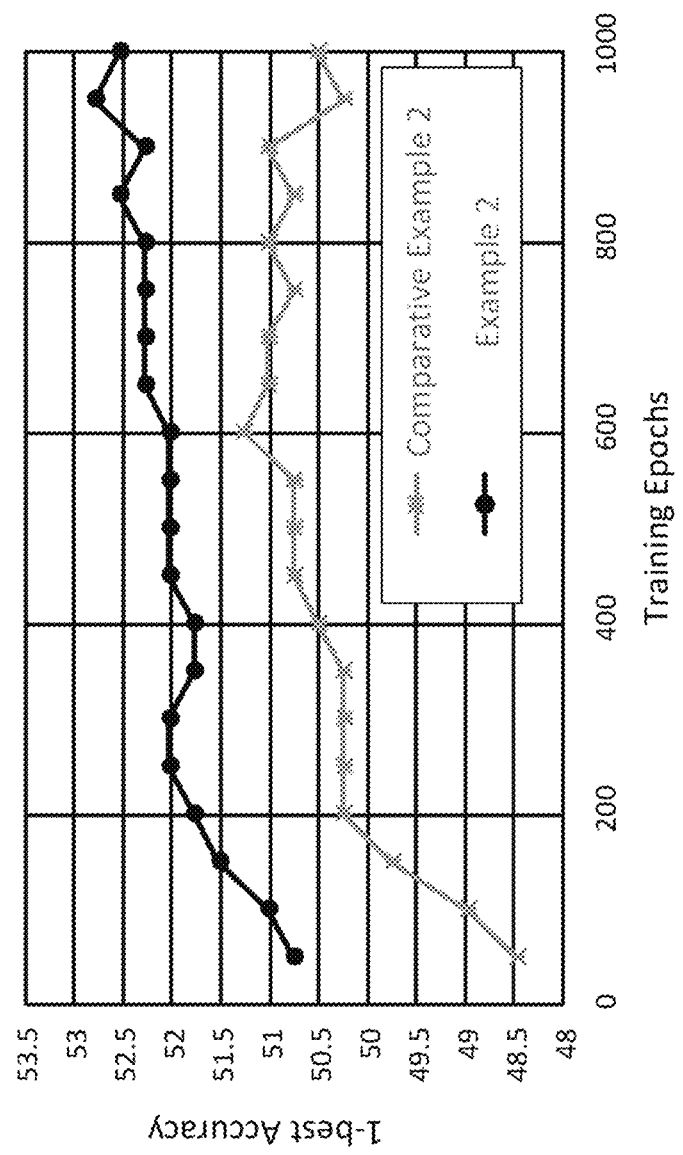
FIG. 9 shows classification accuracy versus training epoch on the 3K data during training.

FIG. 9 shows classification accuracy versus training epoch on the 3K data during training for the example 2 and the comparative example 2. The novel weight initialization outperformed the random initialization from early stage of training epochs. It was demonstrated that the novel weight initialization can improve accuracy in real-world data with limited size of training data and limited training time.

Experimental Studies for Open Public Data

The program implementing the process shown in FIG. 4 was executed for public multi-label topic categorization data (Reuters Corpus Volume 1; RCV1). RCV1 has 23,149 training text and 781,265 evaluation text with 103 topic labels.

The neural network with architecture shown in FIG. 7 with the top hidden layer 258 of 2,000 units, and the label prediction layer 260 of 103 output units with cross entropy loss function was employed. By the processing at step S103B shown in FIG. 4, a weight matrix of 2000×103 between the top hidden layer 258 and the label prediction layer 260 were initialized with preparing dedicated hidden units with UB for example 9 and without preparing any dedicated hidden units for comparative example 6.

The 1-best accuracy of the topic label classification in the comparative example 6 was 93.95%. By comparing with the comparative example 6, the 1-best accuracy of the topic label classification was improved from 93.95% to 94.60% which was statistically significant ($p<0.001$).

Cloud Environment Implementation

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure including a network of interconnected nodes.

Figure 10:
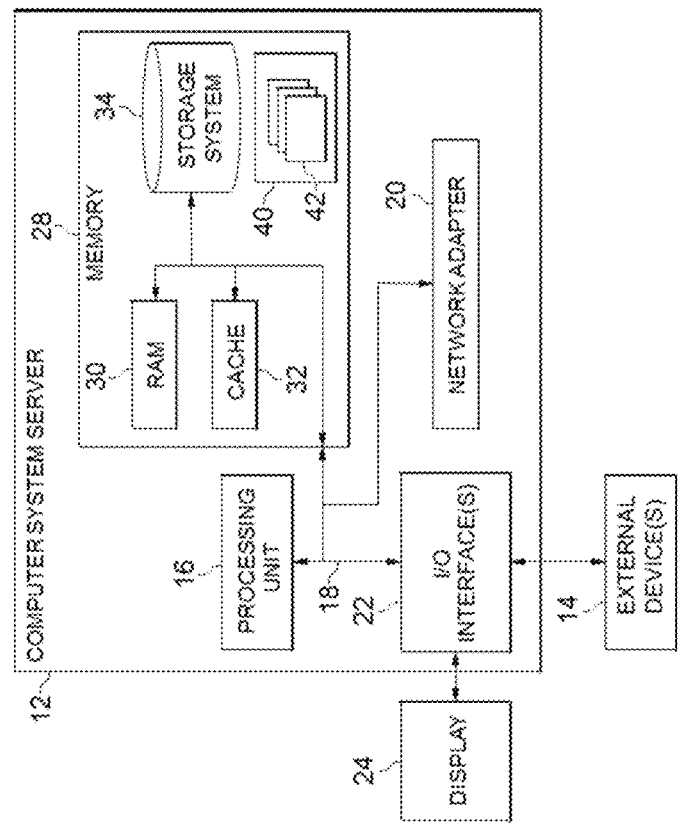
FIG. 10 depicts a cloud computing node according to an embodiment of the present invention.

Referring now to FIG. 10, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 11:
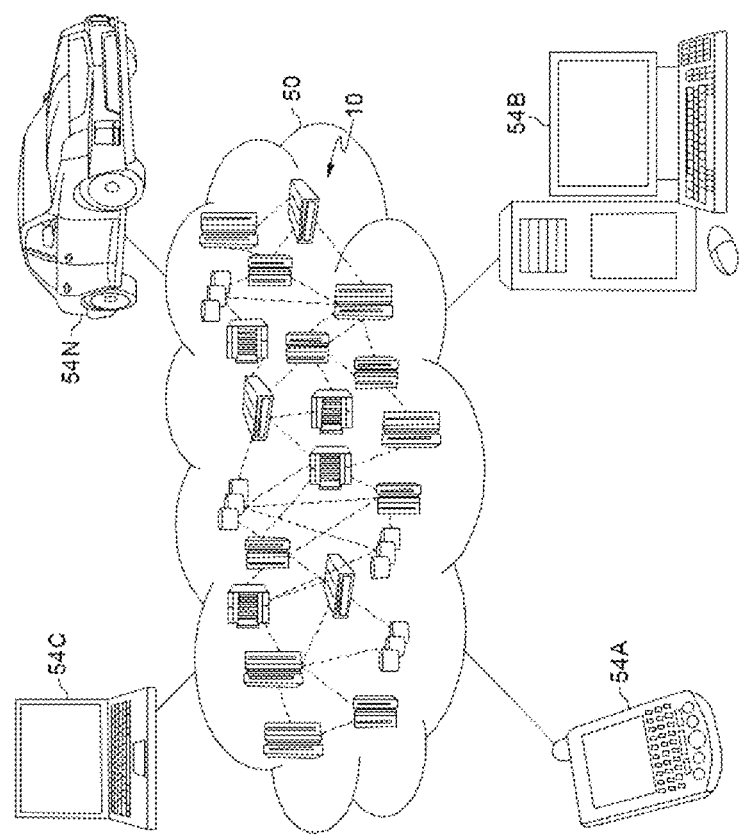
FIG. 11 depicts a cloud computing environment according to an embodiment of the present invention.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
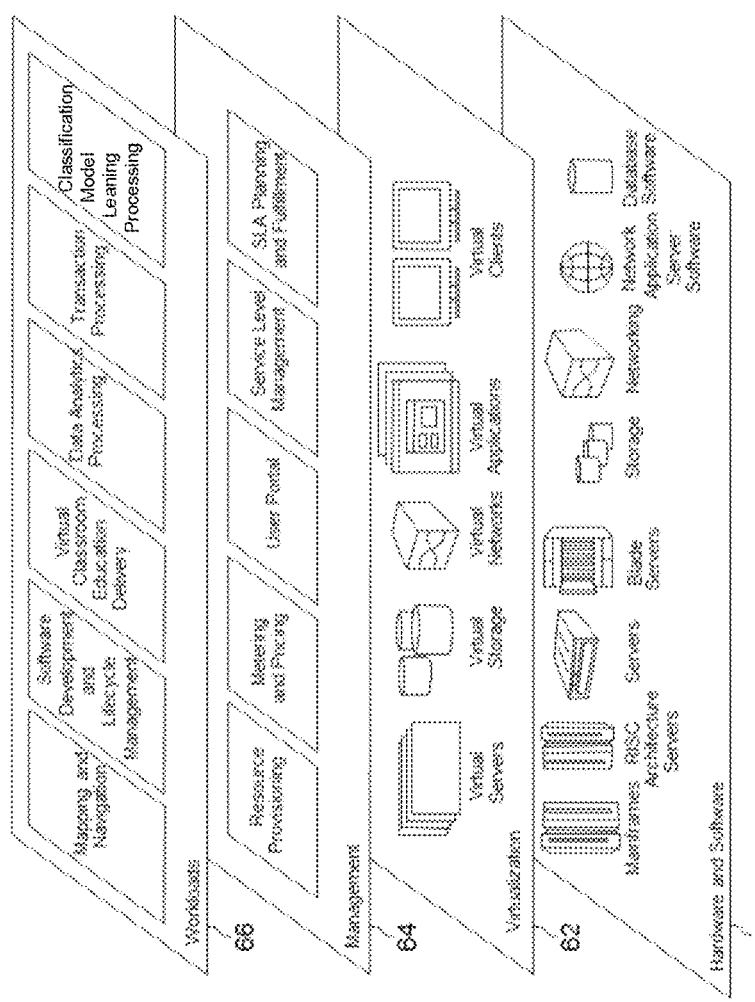
FIG. 12 depicts abstraction model layers according to an embodiment of the present invention.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and classification model learning processing.

In particular embodiments, there is provided a computer program product or software that implements the classification model learning processing in accordance with embodiments described herein, as a service in a cloud environment. In a particular embodiment, the above-mentioned learning process of the neural network based classification model may be performed in the cloud computing environment.

Computer Program Implementation

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for learning a classification model using one or more training data each having a training input and one or more correct labels assigned to the training input, the classification model having a plurality of hidden units and a plurality of output units, the method comprising:

obtaining a combination of co-occurring labels expected to be appeared together for an input to the classification model;

initializing the classification model with preparing a dedicated unit for the combination, from among the plurality of the hidden units so as to activate together related output units connected to the dedicated unit among the plurality of the output units, each related output unit corresponding to each co-occurring label in the combination;

wherein the dedicated unit having connections with related output units each corresponding to each co-occurring label in the combination, each connection being initialized with a value greater than other connections with remaining output units other than the related output units and between at least part of remaining hidden units among the plurality of the hidden units and the plurality of the output units including the related output units;

training the classification model using the one or more training data.

2. The method of claim 1, wherein the plurality of the hidden units forms one or more hidden layers and the plurality of the output units forms an output layer, the initializing the classification model comprising: initializing a weight matrix between the output layer and a hidden layer below the output layer, the weight matrix having a dedicated row for the combination of the co-occurring labels and remaining rows other than the dedicated row, the dedicated row having columns each corresponding to each co-occurring label, the columns being initialized with a value greater than any remaining columns in the dedicated row other than columns corresponding to the co-occurring labels in the combination and other columns in the remaining rows.

3. The method of claim 2, wherein the value varies based on a frequency of the combination appeared in the one or more training data.

4. The method of claim 1, wherein the value is an upper limit value for the connection or an upper bound value for normalized initialization.

5. The method of claim 1, wherein the value varies based on a frequency of the combination appeared in the one or more training data.

6. The method of claim 1, wherein the initializing the classification model comprises:
preparing connections between the dedicated unit and remaining output units with zero; and
preparing at least part of remaining hidden units among the plurality of the hidden units with random initialization.

7. The method of claim 1, wherein the obtaining the combination of the co-occurring labels comprises:
listing a plurality of combinations of labels co-occurred in the one or more training data; and
selecting a subset from among the plurality of the combinations based on a frequency of appearance relevant to each combination in the one or more training data.

8. The method of claim 1, wherein the training input is a query in a form of a natural sentence or representation of the natural sentence and each correct label is a document identifier identifying a document having an answer for the query, the classification model performing a natural language query classification task.

9. The method of claim 1, wherein the training input is a text in a form of a natural sentence or representation of the natural sentence and each correct label is an attribute assigned for the text, the classification model performing a text classification task.

10. The method of claim 1, wherein the dedicated unit after the training still simultaneously activates the related output units corresponding to the co-occurring labels in the combination.

11. A system for learning a classification model using one or more training data each having a training input and one or more correct labels assigned to the training input, the classification model having a plurality of hidden units and a plurality of output units, the system comprising:
a memory;
a processor communicatively coupled to the memory; and
a module for learning a classification model configured to carry out the steps of a method comprising:
listing a combination of co-occurring labels expected to be appeared together for an input to the classification model;
initializing the classification model with preparing a dedicated unit for the combination from among the plurality of the hidden units so as to activate together related output units connected to the dedicated unit among the plurality of the output units, each related output unit corresponding to each co-occurring label in the combination; and
wherein the dedicated unit of the method further comprises: a connection with each related output unit, each connection being initialized with a value greater than other connections between the dedicated unit and remaining output units other than the related output units and between at least part of remaining hidden units among the plurality of the hidden units and the plurality of the output units including the related output units;
training the classification model using the one or more training data.

12. The system of claim 11, wherein the plurality of the hidden units forms one or more hidden layers and the plurality of the output units forms an output layer, the initializing the classification model step of the method further comprising the step of: initializing a weight matrix between the output layer and a hidden layer below the output layer, the weight matrix having a dedicated row for the combination of the co-occurring labels and remaining rows other than the dedicated row, the dedicated row having columns each corresponding to each co-occurring label, the columns being initialized with a value greater than any remaining columns in the dedicated row other than columns corresponding to the co-occurring labels in the combination and other columns in the remaining rows.

13. The system of claim 11 wherein the value of the initializing a weight matrix step of the method is an upper limit value for the connection or an upper bound value for normalized initialization.

14. The system of claim 11, wherein the value of the initializing a weight matrix step of the method varies based on a frequency of the combination appeared in the one or more training data.

15. The system of claim 11, wherein the initializing a classification model step of the method further comprises the steps of:
preparing connections between the dedicated unit and remaining output units with zero; and
preparing at least part of remaining hidden units among the plurality of the hidden units with random initialization.

16. The system of claim 11, wherein listing a combination of co-occurring labels step of the method further comprises the steps of:
listing a plurality of combinations of labels co-occurred in the one or more training data; and
selecting a subset from among the plurality of the combinations based on a frequency of appearance relevant to each combination in the one or more training data.

17. The system of claim 11, wherein the system is provided in a cloud computing environment.

18. A non-transitory computer program product for learning a classification model using one or more training data each having a training input and one or more correct labels assigned to the training input, the classification model having a plurality of hidden units and a plurality of output units, including a computer readable storage medium having program instructions embodied therewith, the program instructions executable by a computer to cause the computer to perform the steps of a method comprising:
obtaining a combination of co-occurring labels expected to be appeared together for an input to the classification model;
initializing the classification model with preparing a dedicated unit for the combination from among the plurality of the hidden units so as to activate together related output units connected to the dedicated unit among the plurality of the output units, each related output unit corresponding to each co-occurring label in the combination; and
wherein the dedicated unit of the method further comprises: a connection with each related output unit, each connection being initialized with a value greater than other connections between the dedicated unit and remaining output units other than the related output units and between at least part of remaining hidden units among the plurality of the hidden units and the plurality of the output units including the related output units;

training the classification model using the one or more training data.

19. The computer program product of claim 18, wherein the value varies based on a frequency of the combination appeared in the one or more training data.

20. The computer program product of claim 18, wherein the obtaining the combination of the co-occurring labels comprises:
 listing a plurality of combinations of labels co-occurred in the one or more training data; and
 selecting a subset from among the plurality of the combinations based on a frequency of appearance relevant to each combination in the one or more training data.

\* \* \* \* \*